(12) United States Patent
Belleville

(10) Patent No.: US 8,708,275 B2
(45) Date of Patent: Apr. 29, 2014

(54) ENERGY STORAGE AERODYNAMIC BRAKING DEVICE AND METHOD

(75) Inventor: Mathieu Belleville, Bazus (FR)

(73) Assignee: Airbus Operations S.A.S., Toulouse (FR)

( * ) Notice: Subject to any disclaimer, the term of this patent is extended or adjusted under 35 U.S.C. 154(b) by 747 days.

(21) Appl. No.: 12/531,980

(22) PCT Filed: Mar. 19, 2008

(86) PCT No.: PCT/FR2008/050474
§ 371 (c)(1),
(2), (4) Date: Feb. 22, 2010

(87) PCT Pub. No.: WO2008/132375
PCT Pub. Date: Nov. 6, 2008

(65) Prior Publication Data
US 2010/0170981 A1    Jul. 8, 2010

(30) Foreign Application Priority Data
Mar. 20, 2007   (FR) ...................................... 07 53929

(51) Int. Cl.
*B64D 41/00* (2006.01)
*B64C 9/32* (2006.01)

(52) U.S. Cl.
USPC ............................................ 244/58; 244/113

(58) Field of Classification Search
USPC ........... 244/53 R, 55, 58, 62, 65, 113, 110 D; 416/142, 143, 132 R, 133, 134 A
See application file for complete search history.

(56) References Cited

U.S. PATENT DOCUMENTS

| 1,765,818 A | 6/1930 | Alvistur |
| 4,936,526 A * | 6/1990 | Gries ................................ 244/69 |
| 5,150,859 A | 9/1992 | Ransick |
| 6,550,719 B2 * | 4/2003 | Konig ............................. 244/55 |
| 8,302,902 B2 * | 11/2012 | Lynas et al. ...................... 244/58 |

(Continued)

FOREIGN PATENT DOCUMENTS

| FR | 859585 A | 12/1940 |
| FR | 987974 A | 8/1951 |

(Continued)

OTHER PUBLICATIONS

International Search Report and Written Opinion dated Sep. 17, 2008.

*Primary Examiner* — Timothy D Collins
*Assistant Examiner* — Brian O'Hara
(74) *Attorney, Agent, or Firm* — Ingrassia Fisher & Lorenz P.C.

(57) ABSTRACT

In order to generate an efficient aerodynamic braking force, whatever the speed of a vehicle such as an airplane flying in the air, the method includes a step for the production of energy by the vehicle, a step of storage of the energy produced and a step of utilization of such energy to drive a propeller which generates a force opposing the forward motion of the vehicle. Energy is produced by using the displacement of the vehicle with respect to air using a propeller driving a generator, or using the displacement with respect to the ground, using wheels driving a generator, or using generators driven by motors of the vehicle. The energy can be stored in the pneumatic, electric or kinetic form and the generation and driving means are selected according to the technology used for the storage means.

8 Claims, 2 Drawing Sheets

(56) References Cited

U.S. PATENT DOCUMENTS

| | | | |
|---|---|---|---|
| 8,573,533 B2 * | 11/2013 | Lynas et al. | 244/58 |
| 2005/0224642 A1 | 10/2005 | Sullivan | |
| 2008/0308685 A1 * | 12/2008 | Decker | 244/53 R |
| 2009/0121546 A1 | 5/2009 | Langlois et al. | |

FOREIGN PATENT DOCUMENTS

| | | |
|---|---|---|
| FR | 1047826 A | 12/1953 |
| FR | 2884804 A | 10/2006 |
| GB | 2263675 A | 8/1993 |
| WO | 0059780 A | 10/2000 |

* cited by examiner

ENERGY STORAGE AERODYNAMIC BRAKING DEVICE AND METHOD

CROSS-REFERENCE TO RELATED APPLICATIONS

This application claims priority to International Application PCT/FR2008/050474 filed 19 Mar. 2008, which claims priority to French Application No. 07 53929 filed on 20 Mar. 2007, the disclosures of which are incorporated herein by reference in their entireties.

BACKGROUND

1. Field

The aspects of the disclosed embodiments relate to the field of the control of airplane flights. More particularly, the aspects of the disclosed embodiments relate to devices intended to act on the drag force of planes generally grouped under the name of "airbrakes".

2. Brief Description of Related Developments

The drag of airplanes is normally considered as a defect which must be fought since the drag is opposed to the forward motion of the airplane and increases the consumption of fuel.

However, there are particular times during the flight of a plane, when it is useful to increase the drag so as to decelerate more quickly than under the simple effect of the ordinary drag of the airplane or in order to avoid an excessive acceleration during a descent.

Being able to increase the drag at some times of the flight becomes all the more useful since maximum efforts are made by the design teams to reduce the cruise drag.

To increase the drag, an airplane 1 includes airbrakes 2, generally composed of rigid elements positioned so as not to generate drag during the cruise flight and including one or several so-called deployed positions, so that the rigid elements have a surface which opposes the forward motion in air. Many shapes of airbrakes, positioned on the wings of the airplane or on the fuselage, exist and are used on civil or military airplanes.

Such airbrakes are all the more efficient when the speed of the aircraft is high. More precisely, the drag force, thus the resulting deceleration, is directly a function of dynamic pressure, i.e. is, for a given position of the airbrakes, proportional to a term in $\rho v^2$ where $\rho$ is the density of the fluid (air at the flight altitude) and V the displacement speed of the airplane with respect to the fluid.

The problem entailed in this braking means is the loss of efficiency when speed is reduced. It is, for example, 6 times lower at 50 m/s, which is the typical speed of a modern airplane at the time of the landing, than at 125 m/s, which is the typical speed at the end of the descent and it becomes negligible very rapidly when the speed is further reduced, more particularly after the landing.

Other means exist to slow down an airplane 1, more particularly after the landing, such as the reversal of the thrust direction of the motors 3 of the airplane or the braking of the wheels 4 in contact with the runway.

Although they are largely used on civil planes, such means have numerous defects.

Thrust inverters 5 used on reactors are complex, heavy and expensive to produce as well to exploit. In addition to the mass penalty they represent for the airplane, they reduce the performances of the motor in normal operation mode, because of the inevitable imperfections of such devices which induce aerodynamic drags and load losses which entail excessive consumptions.

Braking systems of the wheels 4 are of a limited efficiency, when the runway is contaminated by water, snow or ice and their utilization causes brakes and tires friction elements to wear and so these must be replaced all the more frequently when brakes are used intensively.

Then, there is a real interest in using means making it possible to obtain an efficient braking force of the airplane at any speed and which makes it possible to simplify the existing devices and to limit the use thereof in operation.

SUMMARY

In order to generate, at the right time, a breaking aerodynamic force which is not penalized by the slow speed of a vehicle with respect to air, the present application provides a method for generating an aerodynamic braking force on the vehicle moving in a displacement direction with respect to the mass of the surrounding air.

Said method includes:
- a step of generation of energy by said vehicle,
- a step of storage of the energy generated by said vehicle, and
- a step of utilization of said energy for generating an aerodynamic force which is different from the drag force, and applied to the vehicle and substantially opposed to the direction of the displacement.

Energy is stored in a form which can be used by the means which generates the aerodynamic braking force, for example, at least partially in the form of kinetic energy or in the form of pneumatic energy or in the form of electric or electrochemical energy.

In one embodiment of the method, the step of generation of energy by the vehicle includes a step during which the generated energy is sampled from the kinetic energy of the vehicle and/or a step during which the generated energy is produced by vehicle-mounted means.

When the stored energy is sampled from the kinetic energy of the vehicle, the sampling is carried out using the displacement of the vehicle with respect to the air mass, more particularly at times during which the speed with respect to air is high and/or using the displacement of the vehicle with respect to the ground.

Advantageously, the sampling of energy from the kinetic energy of the vehicle is used for producing a deceleration of the vehicle and for avoiding or limiting the use of other braking means.

Advantageously, the intensity and direction of the aerodynamic braking force generated during the step of utilization of energy are modulated for matching the desired deceleration, and the aerodynamic braking means are used for generating a passive aerodynamic drag which makes it possible to avoid or to limit the utilization of specific airbrakes.

To provide efficient aerodynamic braking under any condition more particularly at low speed, the aerodynamic braking device of the vehicle according to the invention includes first vehicle-mounted means for producing energy able to be stored, second vehicle-mounted means able to store the energy generated by said first means and third vehicle-mounted means for generating an aerodynamic force from the energy stored in said second means.

In one embodiment, the first vehicle-mounted means for producing energy includes at least one propeller able to be driven in rotation by the relative displacement of the vehicle with respect to the air mass.

Said at least one propeller is coupled to at least one generator able to produce energy able to be stored.

In another embodiment, when the vehicle includes wheels driven, at least temporarily, in rotation by the displacement of the vehicle on the ground, the first vehicle-mounted means for producing the energy includes at least one generator, able to produce energy, able to be stored, able to be driven in rotation by the rotation of the wheels.

The at least one generator able to produce energy able to be stored is advantageously a compressor compressing a gas or an electric generator or a hydraulic pump.

The second vehicle-mounted means able to store energy are static energy storage means including at least one compressed gas tank and/or an electric or electrochemical storage battery and/or are energy kinetic storage means including at least one fly wheel able to rotate about one axis.

When the energy storage means uses a fly wheel, said fly wheel is driven in rotation about its axis by a pneumatic motor and/or by a hydraulic motor or it is mechanically coupled to the propeller operated in a wind energy mode.

Advantageously, to facilitate the installation of the fly wheel when the storage means use a fly wheel, said fly wheel is capable of driving in rotation energy-generating means which includes at least one pneumatic compressor and/or an electric generator and/or a hydraulic pump.

Advantageously, the means for driving in rotation the at least one fly wheel is able to generate energy when it is driven in rotation by said at least one fly wheel.

To obtain an aerodynamic braking force with a correct yield and a sufficient intensity, the third vehicle-mounted means generating an aerodynamic force advantageously includes at least one propeller able to be coupled to rotation driving means preferably including at least one pneumatic motor and/or one electric motor and/or one hydraulic motor able to be supplied by the energy stored by the second vehicle-mounted means.

Advantageously, the at least one propeller used by the third means for generating the braking aerodynamic force is also used by the first means to produce energy able to be stored and the at least one generator able to produce energy when it is driven by the at least one propeller is also able to drive the propeller in rotation when it is supplied with energy.

At the same time or alternatively, the storage means is able to be supplied with energy by generators coupled to vehicle-mounted power generators.

In order to control the load of the storage means and the braking aerodynamic force, the device includes regulation means acting on the pitch of the blades of the at least one propeller.

To minimize the impact of the device on the vehicle aerodynamics, the device includes means for storing energy-generating elements or aerodynamic braking forces generating means in contact with the aerodynamic flow when they are used, in order to reduce the aerodynamic drag when they are not used.

BRIEF DESCRIPTION OF THE DRAWINGS

The detailed description of one embodiment of the invention is made while referring to the Figures which show.

DETAILED DESCRIPTION

Figure 1:
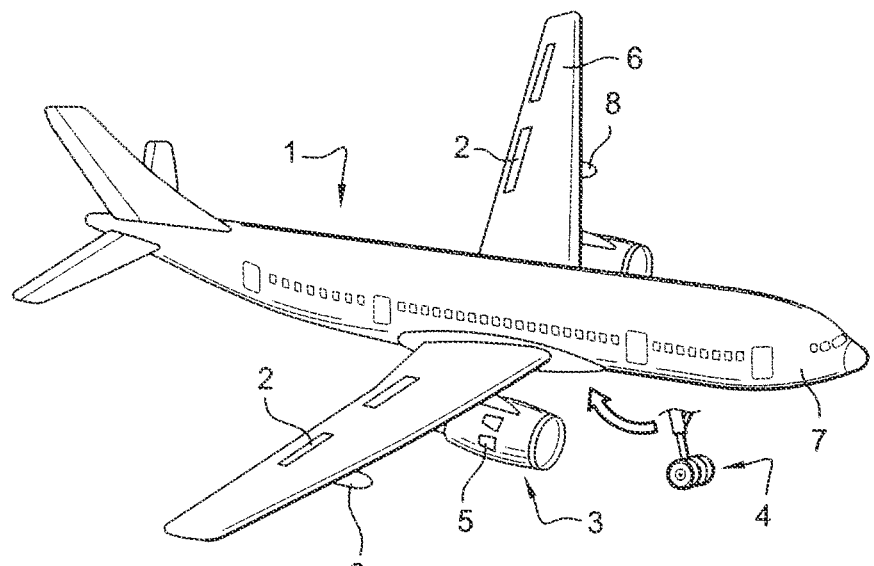
FIG. 1: as already mentioned, a general view of an airplane and the various parts used during the implementation of the invention.
Figure 5A:
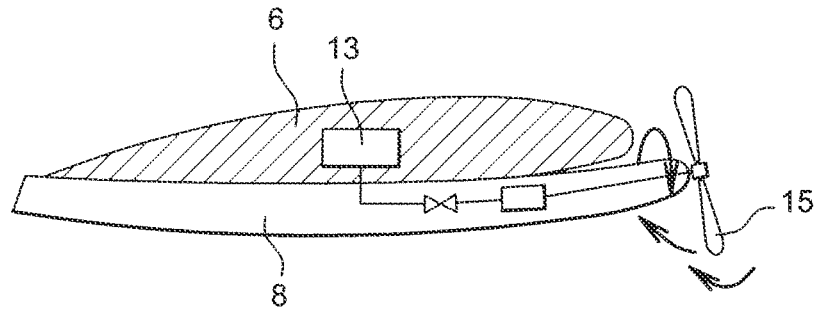
FIGS. 5a and 5b: a cross-sectional view of an exemplary installation of the device according to the invention in the wings of a plane, in an operational position in FIG. 5a and stored position in FIG. 5b.
Figure 5B:
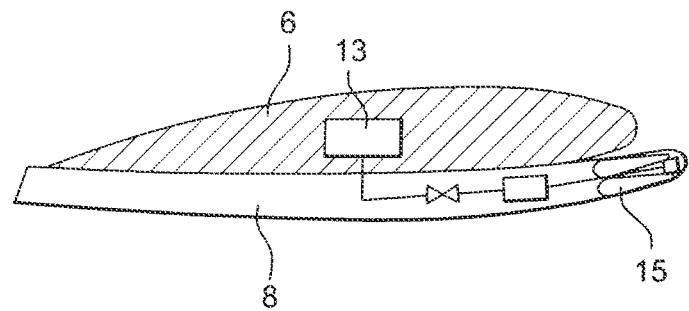
Figure 2:
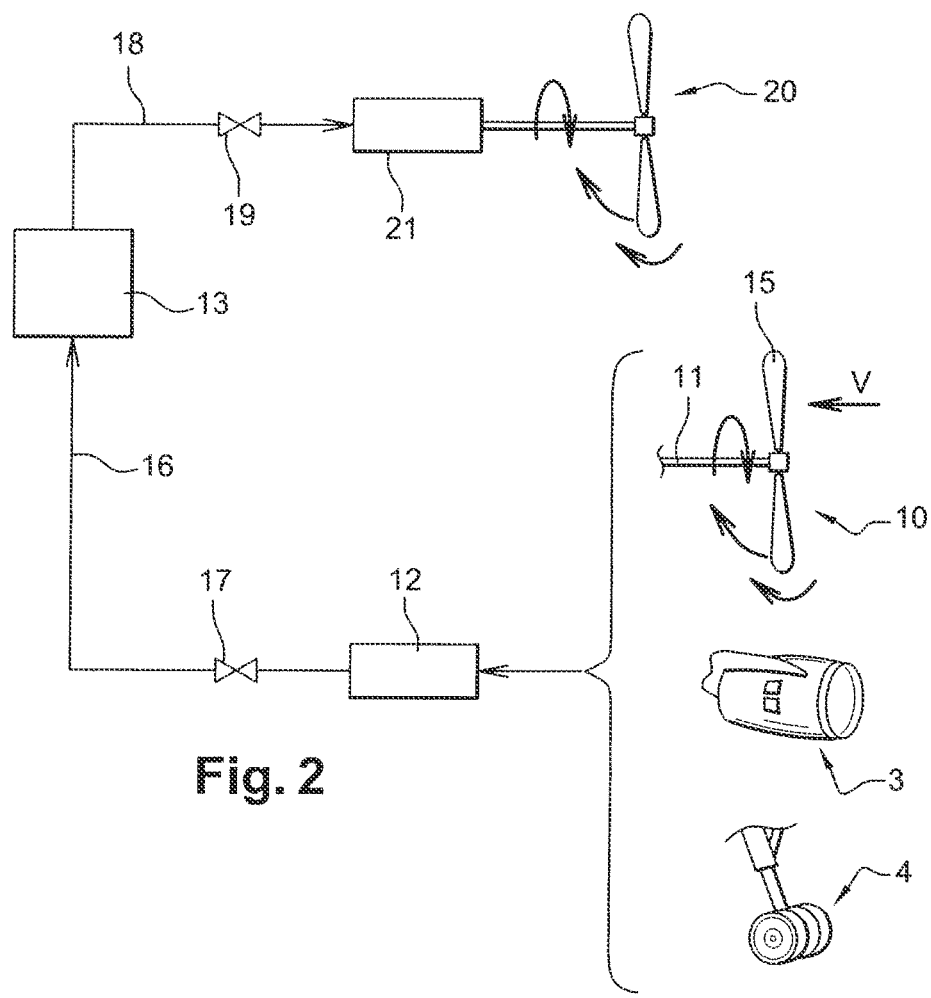
FIG. 2: a principle diagram of the invention and its major components.

A method according to the invention consists of a first step to store an available energy aboard the plane, by sampling this energy using means and during steps of the flight during which said sampling of energy from the performances of the plane is advantageous or acceptable, as regards degradation, and in a second step, to use the energy stored for generating an aerodynamic force opposed to the forward motion speed of the plane.

In a first implementation of the method, the stored energy is sampled from the kinetic energy of the plane 1 and is generated by using speed V of the plane 1 with respect to air.

Energy is sampled using at least one propeller 10 integral with the plane 1 and operated in a so-called wind energy mode, i.e. the propeller is driven by the relative speed of the flow caused by the displacement of the plane 1 in air.

The rotation of the shaft 11 of the propeller 10 is connected to the rotating shaft of a generator 12, so that the generator 12 is driven by the rotation of the propeller 10. The generator 12 is selected so as to produce energy capable of being transported by transfer means 16 to be stored in vehicle-mounted storage means 13. Control and regulation means 17, for example controlled by a computer not shown, are associated with the means for generating, transporting and storing energy.

A method consists in storing energy in the form of a compressed gas in at least one storage tank of the storage means 13, for example air, and in this case the generator 12 advantageously includes compression means which are coupled to the propeller 10. When the propeller 10 is driven in rotation by the relative displacement of air about the plane 1, the compression means compresses gas, for example, air sampled from the plane environment, and this compressed gas is sent to the at least one storage tank to be stored using ducts including means such as valves, non-return valves, probes and regulators useful in the operation of the device.

Another method consists in storing energy in the electric form in electric or electrochemical cell batteries associated with storage means 13 and in this case the generator 12 advantageously includes electric generation means coupled to the propeller 10. When the propeller 10 is driven in rotation by the relative displacement of air about the plane, the electric generation means produces electric energy which is used for charging the cell batteries.

Another method consists in storing energy in the kinetic form using kinetic storage means including at least one fly wheel 14 driven in rotation by driving means capable of coupling the shaft 11 of the propeller 10 and the shaft of the at least one fly wheel. In this case, the energy stored depends on the rotation speed ω of the fly wheel or wheels 14 and the driving means is advantageously capable of varying the ratio between the rotation speed of the shaft 11 of the propeller 10 and the rotation speed ω of the at least one fly wheel 14.

These driving means with a variable ratio may, for example, consist of an assembly of pinions, various relative positions of which make it possible to obtain different rotation speed ratios between an input shaft and an output shaft. They can also consist of hydraulic driving means, wherein the propeller 10 drives a hydraulic pump and the at least one fly wheel 14 is driven by a hydraulic motor coupled to said pump, said pump and/said motor having variable displacements.

They may also consist of electric or pneumatic driving means, wherein the propeller 10 drives an electric or pneumatic generator and the at least one fly wheel 14 is driven by an electric or pneumatic motor coupled to the generator associated with the driving means.

Regulation means, not shown, is advantageously implemented so that the device intended to generate energy and to store said energy is operated within the various mechanical and/or electric and/or hydraulic and/or aerodynamic limitations met by such means. More particularly, the propeller 10 advantageously includes variable pitch blades 15 and the pitch is modified, in a controlled way, by the regulation means as a function of the rotation speed of the propeller and the load of the propeller.

When energy is stored in vehicle-mounted storage means 13, said energy is used for generating an aerodynamic braking force using a propeller 20 coupled to a motor 21 connected to the storage means 13 by energy transfer means 18, the rotation direction and the pitch of which are selected so as to cause on the plane 1 a force opposed to the direction of displacement of said plane in air. The force created by this propeller 20 has the advantage of:

being capable of a modulation in intensity more particularly by acting on the means 19 controlling the power delivered by the motor 21;

keeping a high intensity when the speed V of the plane is low, which is not possible with the conventional airbrakes 2.

The motor 21 which drives the propeller 20 during the aerodynamic braking phases is adapted to the energy storage mode and restitution mode. Preferably, the motor 21 is a pneumatic motor when energy is stored in accumulation means 13 in the form of compressed gas or an electric motor when energy is stored in electric cell batteries.

When energy is stored in the kinetic form, the propeller 20 is driven either by a mechanical connection with the fly wheel 14, the fly wheel 14 being used as a motor rotor, or the fly wheel 14 drives a generator which can be, for example, a hydraulic, a pneumatic or an electric one, and the propeller 20 is driven by a motor coupled to the generator and driven by the fly wheel adapted to the selected technology.

Figure 3:
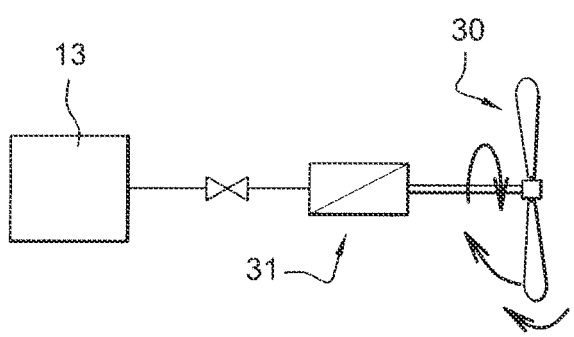
FIG. 3: a principle diagram of one embodiment of the invention using components with a reversible operation.
Figure 4:
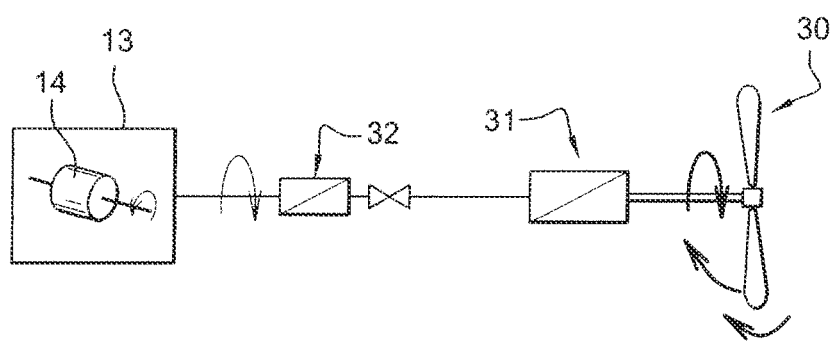
FIG. 4: a principle diagram of an embodiment of the invention implementing a kinetic storage of energy and a wind energy mode for energy collection.

Advantageously, some means used for implementing the step of storing energy and for the step of creating a braking aerodynamic force are the same and selected so as to be operated in a reversible way, as illustrated in FIGS. 3 and 4.

More particularly, the propeller 30 which is used for generating the aerodynamic braking force, when it is driven by a motor, is advantageously used for producing energy to be stored, by driving a generator. The (pneumatic, hydraulic or electronic) generator is then preferably selected first to be capable of being operated in motor mode, depending on whether the device is operated in energy-storage mode or in braking aerodynamic force creation mode.

Such generators/motors 31, the operation of which is reversible, are well-known in hydraulic, pneumatic and electric fields, and it is possible to reduce the mass, the volume and the cost of the device according to the invention when using a motor/generator 31 coupled to the propeller 30 and a motor/generator 32 coupled to kinetic storage means if such means is used.

So as not to generate an inacceptable drag penalty during the cruise flight, when the device is not used, the propeller 10, 20, 30 is advantageously folded, which means that the blades 15 of the propeller are positioned with their axes substantially parallel to the rotation axis of the propeller.

In another embodiment, not shown, the propeller is carried by a mechanical device which makes it possible to store the propeller, with the blades folded or not, when said propeller is not used in a recess provided for this purpose.

The components (generators, motors, storage means and control and regulation systems of the device) are preferably distributed in volumes available along the fuselage 7 and/or the wings 6 of the plane 1. When the constraints of installation of the various components, more particularly the distance between the storage means and the generation means and/or the motors must be limited, for example for pneumatic or hydraulic connections, the components can be assembled in volumes protected by aerodynamic fairings 8 which are advantageously associated with fairings of the plane which exist for other reasons, for example fairings surrounding the slotted flap rails.

The energy to be stored which is produced by the propeller 10, 30 coupled to a generator and driven in rotation by the effect of a relative displacement of the plane with respect to the air mass will preferably be produced at a time, on the one hand when the aerodynamic braking is desired since this production of energy generates a drag force, and on the other hand when the speed of the plane is still relatively high in order to take advantage of a high dynamic pressure to drive the propeller and the generator coupled to said propeller. These conditions are met during the flight of the plane, for example during the descent from a cruise altitude to a stand-by or approach altitude, with speed V is high and the airbrakes 2 are frequently used to maintain or reduce the speed on the trajectory during the descent, or to descent more quickly without the speed on the trajectory increasing. During the descent phase, it is thus possible to take advantage of a high dynamic pressure to efficiently drive the propeller in wind energy mode or in generating an aerodynamic drag which causes the braking desired. In addition, the descent phase during which these conditions, i.e. high dynamic pressure and need for aerodynamic braking are met, generally comes before a phase of flight leading to the landing, during which the dynamic pressure is much lower because of the reduced speed of the plane and during which it is useful, if not necessary, to use efficient aerodynamic braking means. When the aerodynamic braking caused by the operation in wind energy mode of the propeller 10, 30 for storing energy is no longer sufficient, the energy stored in the means 13 is used for driving a propeller 20, 30, preferably the same propeller 30 as already described and dynamically generate an aerodynamic braking force.

In a second implementation of the method, the stored energy is sampled from the kinetic energy of the plane 1 and is generated using the speed of the airplane with respect to the ground, when the plane 1 has landed.

In this second mode, wheels 4 drive means 12 for generating energy able to be stored by storing means 13 and/or to be used by aerodynamic braking means.

Similarly to the first mode, the aerodynamic braking force is created using at least one propeller 20, the pitch and the rotation direction of which generate on the airplane 1 a force opposed to the plane forward motion. Said at least one propeller 20 is driven by a motor 21 supplied by the energy stored in the storage means 13.

For example, when the plane 1 lands and the wheels are rotated by the displacement of the plane on the runway, compressed air generation means coupled to the wheels is driven and produces pressurised air which is stored in at least one storage tank. Said pressurised air is used by a pneumatic motor coupled to the at least one propeller for driving said at least one propeller in rotation. The generation and storage means can use another form of electric energy for example.

In this second mode, the storage means 13 is preferably means enabling a quick storage of energy. As a matter of fact, the running phase of a landing plane is short and the maximum energy must be sampled at the beginning of the landing, when the running speed is maximum, thus the kinetic energy of the plane is still relatively high, to be used to create an aerodynamic braking force during the whole running phase. In a conjugated or alternative way, the energy produced by the generating means coupled to the wheels 4 can be directly used by the aerodynamic braking force generation means without being stored.

Besides, the sampling of energy from the wheels 4 to supply the braking aerodynamic force generating means participates in the deceleration of the running plane, which makes it possible to limit the use of conventional brakes.

In a third implementation of the method, the stored energy is produced by at least one motor 3 of the airplane 1. This motor can be used for the propulsion of the plane or a motor of a power auxiliary unit.

In this third mode, the at least one motor 3 drives the means 12 for generating energy able to be stored and/or be used by aerodynamic braking means. Advantageously, such generation means 12 is already existing and available means. As a matter of fact, most of the modern plane motors include electric generations and/or hydraulic generations and/or generations of pressurised air able to generate energy which can be stored, and it is not necessary to use additional generating means.

Advantageously, the energy stored is supplied by the at least one motor 3 during phases of the flight of the airplane 1, during which the performances of said motor are not critical, for example during the descent which comes prior to the landing, if this is a motor used for propulsion. In a conjugated or alternative way, the energy produced by the at least one motor 3 can be directly used by the aerodynamic braking force generating means without being stored.

In all the embodiments of the invention, the at least one propeller 20, 30 used by the device for creating an aerodynamic braking force is advantageously used for creating a passive aerodynamic drag which can be adjusted, when the energy-storage means is not connected to the generator 12, for example when it has reached its maximum storage capacity. The value of this aerodynamic drag can be modulated more particularly by acting on the propeller load in wind energy mode.

For all the embodiments, when the speed V becomes too low for the efficiency of other aerodynamic braking means using the generation of an aerodynamic drag to be satisfactory, because of the dependence thereof on dynamic pressure, the stored energy is used for driving in rotation the propeller 20, 30, the pitch and the driving power of which are adjusted to supply a force opposed to the plane forward motion corresponding to the aerodynamic braking desired.

According to the method, it is possible to obtain an aerodynamic braking force until the null speed of the plane on the runway, that is under conditions where the airbrakes are no longer useful, and thus to replace at least partially the conventionally used devices to brake the plane 1 when it has landed, as the thrust inverters 5 of the motors 3 and/or the wheel brakes 4.

Advantageously, a plane is equipped with two or more devices according to the invention or one device including two or more energy-generating or aerodynamic braking propellers sharing the same energy-storage means.

To obtain a satisfactory efficiency of the aerodynamic braking and minimum impact on the performance during the cruise flight, the device is integrated in the plane on the aerodynamic plane.

The aerodynamic integration of the shapes of the plane belongs to the ordinary work of aerodynamic designers.

Advantageously, the elements of the device will be integrated in volumes available in the structure, existing fairings 8 such as flap fairings or in fairings specifically designed for the device.

When the plane is provided with at least one aerodynamic braking propeller on either side of the plane of symmetry of the plane, for example the wings, deviations of the aerodynamic braking forces between the left and right sides make it possible to act on the side control of the plane, such as with conventional airbrakes but at much lower speeds or even null speeds.

Although the aerodynamic braking method and the associated means are applied in the detailed description to a particular case of the plane, the persons skilled in the art will easily adapt the device to land or surface vehicles which, under certain conditions, have benefit in using aerodynamic braking means. Such conditions are more particularly met when the adherence of said vehicles to the ground does not make it possible to generate sufficient braking forces by friction, for example on a slippery ground, to produce the desired decelerations.

The invention claimed is:

1. An aerodynamic braking device for an aircraft including:
a first aircraft mounted means that produces energy,
a second aircraft mounted means that stores the energy generated by said first means, and
third aircraft mounted means that generates an aerodynamic force to brake the aircraft from the energy stored in said second means, with said first means including at least one propeller able to be driven in rotation by the relative displacement of the aircraft with respect to the air surrounding the aircraft, said at least one propeller being coupled to at least one compressor that compresses a gas to be stored in the second means, the gas including air sampled from air surrounding the aircraft; wherein the third means includes said at least one propeller, said at least one propeller including blades that are positioned with their axes substantially parallel to a rotation axis of said at least one propeller when said device is not in use.

2. A device according to claim 1, wherein the aircraft includes wheels driven, at least temporarily, in rotation by the displacement of said aircraft on the ground and the first aircraft mounted means includes at least one generator that produces energy from the rotation of said wheels.

3. A device according to claim 1, wherein the energy-generating means includes at least one pneumatic compressor.

4. A device according to claim 1, wherein said at least one propeller is able to be coupled to rotation-driving means.

5. A device according to claim 4, wherein the rotation-driving means includes at least one pneumatic motor and/or an electric motor and/or a hydraulic motor able to be supplied by the energy stored by the second aircraft mounted means.

6. A device according to claim 4, wherein the at least one propeller of the first means is mechanically coupled to energy kinetic storage means.

7. A device according to claim 4 including regulation means acting on the pitch of the blades of the propeller or propellers.

8. A device according to claim 1, wherein the at least one compressor able to produce energy when it is driven by the at least one propeller is also able to drive the propeller in rotation when it is supplied with energy.

* * * * *